United States Patent
Sanità et al.

(10) Patent No.: US 10,920,054 B2
(45) Date of Patent: Feb. 16, 2021

(54) RECYCLED POLYOLEFIN COMPONENT FOR HOUSEHOLD APPLIANCES

(71) Applicant: Electrolux Appliances Aktiebolag, Stockholm (SE)

(72) Inventors: Massimo Sanità, Porcia PN (IT); Monica Celotto, Porcia PN (IT)

(73) Assignee: Electrolux Appliances Aktiebolag, Stockholm (SE)

( * ) Notice: Subject to any disclaimer, the term of this patent is extended or adjusted under 35 U.S.C. 154(b) by 7 days.

(21) Appl. No.: 16/308,133

(22) PCT Filed: Jun. 20, 2017

(86) PCT No.: PCT/EP2017/065015
§ 371 (c)(1),
(2) Date: Dec. 7, 2018

(87) PCT Pub. No.: WO2017/220531
PCT Pub. Date: Dec. 28, 2017

(65) Prior Publication Data
US 2020/0032040 A1    Jan. 30, 2020

(30) Foreign Application Priority Data

Jun. 20, 2016   (EP) .................................. 16175216

(51) Int. Cl.
| | | |
|---|---|---|
| *C08L 23/12* | (2006.01) | |
| *C08K 3/26* | (2006.01) | |
| *C08K 3/34* | (2006.01) | |
| *C08K 7/14* | (2006.01) | |
| *C08K 3/014* | (2018.01) | |
| *C08K 3/013* | (2018.01) | |
| *B29B 17/00* | (2006.01) | |
| *C08K 3/36* | (2006.01) | |
| *C08L 23/06* | (2006.01) | |
| *C08L 25/06* | (2006.01) | |
| *C08L 55/02* | (2006.01) | |
| *C08L 67/00* | (2006.01) | |
| *D06F 37/02* | (2006.01) | |
| *D06F 39/12* | (2006.01) | |
| *B29K 23/00* | (2006.01) | |

(52) U.S. Cl.
CPC .............. *C08L 23/12* (2013.01); *B29B 17/00* (2013.01); *C08K 3/013* (2018.01); *C08K 3/014* (2018.01); *C08K 3/36* (2013.01); *C08K 7/14* (2013.01); *C08L 23/06* (2013.01); *C08L 25/06* (2013.01); *C08L 55/02* (2013.01); *C08L 67/00* (2013.01); *D06F 37/02* (2013.01); *D06F 39/12* (2013.01); *B29K 2023/12* (2013.01); *C08K 2003/265* (2013.01); *C08L 2205/02* (2013.01); *C08L 2207/20* (2013.01)

(58) Field of Classification Search
None
See application file for complete search history.

(56) References Cited

U.S. PATENT DOCUMENTS

| | | | | |
|---|---|---|---|---|
| 5,212,223 | A * | 5/1993 | Mack | .......................... C08J 9/08 521/143 |
| 8,677,789 | B2 | 3/2014 | Garcia Bobed et al. | |
| 2011/0056906 | A1* | 3/2011 | Meadows | .......... B65D 47/0838 215/316 |

FOREIGN PATENT DOCUMENTS

| | | | |
|---|---|---|---|
| CN | 101798423 | * | 8/2010 |
| CN | 102086281 | * | 6/2011 |
| CN | 102731903 | * | 10/2012 |
| CN | 103937097 | * | 7/2014 |
| CN | 104844928 | * | 8/2015 |
| EP | 0755729 | A1 | 1/1997 |
| EP | 2107154 | A1 | 10/2009 |
| EP | 2975172 | A1 | 1/2016 |
| JP | 2009248451 | A1 | 10/2009 |
| WO | 2009040302 | A1 | 4/2009 |

OTHER PUBLICATIONS

International Search Report and Written Opinion for International Application No. PCT/EP2017/065015, dated Aug. 14, 2017—9 pages.
Sirmax, "Process Data for Injection Moulding", May 29, 2016, retrieved from the internet: https://web.archive.org/web/20160529070051if_/http://sirmax.com/sites/default/files/ISOFIL%20Process%20Data.pdf, retrieved Mar. 26, 2019, 1 page.
European Communication Pursuant to Article 94(3) for European Application No. 16175216.7, dated Apr. 2, 2019, 7 pages.

* cited by examiner

*Primary Examiner* — David J Buttner
(74) *Attorney, Agent, or Firm* — RatnerPrestia

(57) ABSTRACT

A component for household appliances made of a plastic mixture comprising recycled polyolefin composition deriving from post-consumer plastic materials and/or post-industrial plastic materials and at least one filler. Also provided are a household appliance including the component and a method for manufacturing the household appliance by using the component.

5 Claims, No Drawings

RECYCLED POLYOLEFIN COMPONENT FOR HOUSEHOLD APPLIANCES

This application is a U.S. National Phase application of PCT International Application No. PCT/EP2017/065015, filed Jun. 20, 2017, which claims the benefit of EP Application No. 16175216.7, filed Jun. 20, 2016, both of which are incorporated by reference herein.

TECHNICAL FIELD

The present invention relates to a recycled polyolefin component for household appliances. In particular, the present invention relates to a recycled polyolefin component for washing machines, washer driers, driers, dish washers and food preservation household appliances.

BACKGROUND

Since long time in household appliance sector several types of plastics have been introduced to replace metal components. One of the most important plastic materials is polypropylene. The reason to that success is that polypropylene shows remarkable mechanical characteristics covering a wide range of temperatures.

Another valuable feature is the inertness to the most common chemical compounds. This allows the use of polypropylene in applications where the environment can be aggressive.

Moreover, the mechanical performances of this material can be enhanced by the addition of several type of fillers and reinforcements, such as mineral (e.g. calcium carbonate, talc), glass and cellulosic fibers.

The polyolefine so formulated can be used for structural and non structural applications.

Although the long design practice, the most challenging application is still the washing machine tub shell due to cyclic mechanical loads. In fact it is common for structural application to combine polypropylene with glass fibers to get a reinforcement or talc to get the wanted stiffness and strength.

However, this kind of plastic is very expensive. There is thus a continuous search for enhanced raw materials able to provide reliable mechanical properties without affecting the final cost of the household appliance.

Furthermore, in the last decades, the awareness of the public opinion towards environmental issues has increased; for example, the problem of the impact caused by wastes once the life cycle of a good or a product has finished is strongly felt.

All those initiatives aimed at recovering materials coming from the recycling are therefore more and more appreciated.

However plastics from ended goods have first low intrinsic value and are generally inherently non compatible.

Some industries of recycling sector have made an effort to overcome all those limitation designing recycling processes able to distinguish and separate the different plastics. Therefore some industries have proposed recycled plastics products with sufficiently well defined characteristics that could be used in low end applications such as: pipes, rigid and flexible packaging, gadgets and so on.

A distinguished case is polyethylene terephtalate (PET) from water bottle for which has been developed a specific recovery chain getting so high value to compete with its virgin resin.

The key factor of this framework are the public policies for plastic disposal facilitating the plastics collection and management. This has allowed the recycling industry to develop systems to separate the plastics in some main categories and making a market for recycled plastics.

The recycled plastics, excluded PET bottle and PVC (polyvinyl chloride) and any other with its own specific recovery process, can be defined by its source of disposal system, that is: post-consumer by packaging (food packaging, packaging), post-consumer by waste electrical and electronic equipments (WEEE) and post-consumer by automotive.

However the main difficulty to use that type of plastics for high performance application is their nature of non completely standardized resins.

SUMMARY OF THE INVENTION

Aim of the present invention is therefore to provide plastic household appliance components that show high performances and that are cheap.

In compliance with the above aims, according to the present invention there is provided a component for household appliances made of a plastic mixture comprising a recycled polyolefin composition deriving from post-consumer plastic and/or post industrial plastic materials and at least one filler.

DETAILED DESCRIPTION OF EMBODIMENTS

For the purpose of the present invention, by the term "post-consumer plastic materials" there are meant the selected materials deriving from the separate collection of wastes, especially municipal solid wastes, preferably from packaging.

Another possible definition indicates that the "post-consumer plastic material" are those materials which the consumer has stopped using and which may be solid, thrown away, or discarded as waste (The global Development Research Centre. Solid waste management. Glossary, http://glossary.eea.europa.eu), such as waste electrical and electronic equipments (WEEE) and waste from automotive industries.

For the purpose of the present invention, by the term "post-industrial plastic" materials it is meant that such components are represented by industrial scraps and, i.e., by residues and/or scraps coming from or resulting from industrial processing of virgin plastic materials.

Preferably, though not necessarily, the component is made of a plastic mixture comprising 10-60% recycled polyolefin and 0.1-60% filler, the percentage being by weight of the total plastic mixture.

Preferably, though not necessarily, the component is furthermore characterized in that the recycled polyolefin composition comprises recycled polypropylene (PP).

As regards polypropylene PP, it may be a polypropylene homopolymer, block-copolymer or random copolymer.

For the purposes of the present invention, by the term polypropylene homopolymer it is meant a polymer having a high isotactic degree containing only propylene monomeric units joined head-to-tail, while by the term polypropylene copolymer it is meant a polymer as stated above, containing even small amounts (preferably less than 10%) of ethylene.

The recycled polyolefin composition may comprise:
60-90% polypropylene;
0-20% polyethylene;
0-10% styrenic resin selected from the group consisting of polystyrene, high-impact polystyrene, acrylonitrile butadiene styrene and mixtures thereof;

0-10% other polymers selected from the group consisting of polyethylene terephtalate, polyacrylate, polybutylene terephthalate, polyoxymethylene, poly(p-phenylene oxide) and mixtures thereof, the percentages being by weight of the total recycled polyolefin.

Instead, by the term polyethylene (homopolymer) it is meant a linear polymer only of ethylene monomeric units, therefore highly crystalline.

For the purposes of the present invention, the polyethylene may be a low density polyethylene (LDPE), i.e., with short and long branches, or it may be linear low density polyethylene (LLDPE), with short branches, i.e., an ethylene copolymer with C3-C8 alpha-olefins (i.e., a ethylene copolymer with mono-substituted olefins: propylene, 1-butene, 1-hexene, 1-octene, etc.) or ethylene propylene rubber or mixtures thereof.

The plastic mixture may further comprise 0-50% neat polypropylene by weight of the total plastic mixture.

Preferably, though not necessarily, the component is furthermore characterized in that the filler is selected from the group consisting of a mineral filler and a reinforcing filler. In particular, the mineral filler can be selected from the group consisting of calcium carbonate and talc. The reinforcing filler can be selected from the group consisting of glass fibers and natural fibers, such as cellulose.

Preferably, though not necessarily, the component is furthermore characterized in that the plastic mixture further comprises additives selected from the group consisting of antioxidants and lubricants, more preferably in an amount of from 0 to 1% by weight of the plastic mixture.

The plastic mixture may further comprise grafting polymers such as maleic anhydride polypropylene.

The component according to the invention can be a structural or a non structural component of the household appliance.

For the purpose of the present invention, by the term "structural component" it is meant a component that is able to support loads (weight, force, etc. . . . ) without breaking, tearing apart, or collapsing. Typical structural components in an household appliance are dynamic components able to bear vibrations and movements. Non limitative example of a structural component is the tub shell of a washing machine.

As opposite to "structural components", by the term "non structural element" it is meant a component that is not destined to support loads, i.e. static components.

When the component is a structural component, it is made preferably of a plastic mixture comprising:
10-60% recycled polyolefin;
0-50% neat polyolefin;
0-60% mineral filler;
0-40% reinforcing filler
the percentages being by weight of the total plastic mixture.

The structural component is preferably selected from the group consisting of a washing machine tub and washer drier tub.

When the component is a non-structural component, it is made preferably of a plastic mixture comprising:
30-60% recycled polyolefin;
0-60% mineral filler;
0-20% reinforcing filler
the percentages being by weight of the total plastic mixture.

The non-structural component is preferably selected from the group consisting of washing machine rear panel, washing machine softener case, washer drier rear panel, washer drier softener case, drier rear panel, drier base, dish washer base, dish washer shelf, dish washer sump, dish washer salt case, dish washer softener case, dish washer tank, food preservation household appliance carters and conduit cover.

According to the present invention there is also provided a household appliance comprising the above disclosed component.

According to the present invention there is also provided a method for manufacturing an household appliance characterized in that the above disclosed component is used.

A non-limiting embodiment of the present invention will now be described, by way of example.

EXAMPLE 1

In following table 1, there are illustrated five different plastic mixtures according to the invention.

TABLE 1

| Component | Structural uses Compositions | | | non-Structural uses compositions | |
|---|---|---|---|---|---|
| | #1 | #2 | #3 | #4 | #5 |
| Recycled Polypropylene | 14.25 | 14.25 | 57.00 | 57.00 | 44.00 |
| Neat Polypropylene | 42.75 | 42.75 | — | — | — |
| Additives | 1.00 | 1.00 | 1.00 | 1.00 | 1.00 |
| Polymer grafting | — | 3 | 3 | — | — |
| Mineral filler | 42.00 | 20.00 | — | 42.00 | 55.00 |
| Reinforcement fiber | — | 15.00 | 30.00 | — | — |

Weight in parts hundred of compound (phc)

The mechanical properties of mixtures #1 and #4 of table 1 are illustrated in table 2.

TABLE 2

| Mechanical property | Structural uses Compositions #1 | non-Structural uses compositions #4 |
|---|---|---|
| Density | 1258 ± 12 kg/m$^3$ | 1277 ± 12 kg/m$^3$ |
| Flexural modulus (1.3 mm/min) at 23° C. | >2400 MPa | >2000 MPa |
| Flexural modulus (1.3 mm/min) at 80° C. | — | >500 MPa |
| Tensile stress at yield (50 mm/min) at 23° C. | >20 MPa | >15 MPa |
| Strain at yield (50 mm/min) at 23° C. | >2% | >2% |
| Resilience Izod A at 23° C. | >3 kJ/m$^2$ | >3 kJ/m$^2$ |
| Resilience Izod E at 23° C. | >26 kJ/m$^2$ | >22 kJ/m$^2$ |

The invention claimed is:

1. A component for household appliances, the component comprising a plastic mixture comprising recycled polyolefin composition deriving from post-consumer plastic and/or post industrial plastic materials and fillers, wherein the plastic mixture comprises:
10-60% recycled polyolefin composition;
42-60% mineral filler;

15-40% reinforcing filler;
0-1% additive selected from the group consisting of antioxidants and lubricants; and
0-3% grafting polymer;
the percentages being by weight of the total plastic mixture,
wherein the mineral filler is selected from the group consisting of calcium carbonate and talc, and
wherein the reinforcing filler is selected from the group consisting of glass fibers and natural fibers; and
wherein the plastic mixture has a density of from 1246 kg/m$^3$ to 1289 kg/m$^3$.

2. The component for household appliances according to claim 1, wherein the component is selected from the group consisting of a washing machine tub, a washer drier tub, washing machine rear panel, a washing machine softener case, a washer drier rear panel, a washer drier softener case, a drier rear panel, a drier base, a dish washer base, a dish washer shelf, a dish washer sump, a dish washer salt case, a dish washer softener case, a dish washer tank and a conduit cover.

3. The component for household appliances according to claim 1, wherein the recycled polyolefin composition comprises recycled polypropylene.

4. The component for household appliances according to claim 1, wherein the recycled polyolefin composition comprises:
60-90% recycled polypropylene;
0-20% recycled polyethylene;
0-10% recycled styrenic resin selected from the group consisting of recycled polystyrene, recycled high-impact polystyrene, recycled acrylonitrile butadiene styrene and mixtures thereof; and
0-10% other polymers selected from the group consisting of recycled polyethylene terephthalate, recycled polyacrylate, recycled polybutylene terephthalate, recycled polyoxymethylene, recycled poly(p-phenylene oxide) and mixtures thereof,
the percentages being by weight of the total recycled polyolefin composition.

5. The component for household appliances according to claim 1, wherein the plastic mixture further comprises 14.25 to 50% neat polypropylene by weight of the total plastic mixture.

* * * * *